United States Patent Office 2,844,546
Patented July 22, 1958

2,844,546

CATION EXCHANGE RESINS HAVING PHOSPHORUS ACID FUNCTIONAL GROUPS AND METHOD OF PREPARATION THEREOF

Irving M. Abrams, Redwood City, Calif., assignor to Chemical Process Company, San Francisco, Calif., a corporation of Nevada No Drawing. Application April 27, 1953
Serial No. 351,464

4 Claims. (Cl. 260—2.2)

This invention relates to cation exchange resins whose properties arise from the incorporation in an insoluble resin matrix of acid groups based on phosphorus, said groups being hereinafter called phosphorus acid groups or phosphorus acid functional groups, and to the use of phosphorus trihalide in the preparation of such cation exchange resins.

Cation exchange resins having either sulfonic acid or carboxylic acid functional groups attached to suitable resin matrices are well known. Both of these types of resins have many useful applications. However, the properties of such resins as cation exchangers are quite distinct due to the difference in the nature of their functional exchange groups.

Sulfonic acid cation exchange resins are highly ionized and act as strong acids. The hydrogen form of the sulfonic acid cation exchange resin exchanges hydrogen ions for other cations in media having the wide range of hydrogen ion concentration of approximately pH 2 to 14. However, large excesses of acid are required to regenerate this sulfonic type of resin completely to the acid form. Also, the sulfonic acid type of cation exchange resin is not very satisfactory for use in chromatographic type separations in which adsorption of several constituents is followed by selective elution, since this exchanger holds the adsorbates too strongly for ready release.

On the other hand, carboxylic acid cation exchange resins are only slightly ionized and act as weak acids. This type of cation exchange resin will exchange cations effectively only in alkaline media having a pH range of approximately 8–14. However, such a carboxylic acid cation exchange resin may be regenerated by nearly stoichiometric amounts of acid. The carboxylic acid cation exchange resin releases adsorbates too readily to be of any appreciable value in most chromatographic type separations. Consequently, it is apparent that a cation exchange resin intermediate in activity between the sulfonic acid and the carboxylic acid cation exchangers is to be desired for many purposes.

Summarizing this invention, cation exchange resins of intermediate activity may be prepared by first reacting any aromatic resin suitable for use as an ion exchange resin matrix with phosphorus trihalide in the presence of aluminum chloride to form a halophosphine derivative of the resin matrix, and then hydrolyzing the halophosphine derivative. This hydrolysis substitutes hydroxyl groups for the halogen atoms that are attached to phosphorus in the halophosphine derivative of the resin matrix, and thereby provides a cation exchange resin having phosphorus acid functional groups attached to aromatic nuclei of the resin. The cation exchanging capacity of such cation exchange resins may be increased by oxidizing the trivalent phosphorus in the functional acid groups to pentavalent phosphorus thereby increasing the number of active acid groups attached to phosphorus that are available for exchanging cations.

The resultant phosphorus acid cation exchange resins of this invention are insoluble in aqueous solutions of acids, bases or salts and also in non aqueous solvents. When their capacity is exhausted, they may be repeatedly regenerated for further use with little or no loss of capacity. The acid form of such phosphorus acid type cation exchange resins is effective in exchanging cations over the wide range of hydrogen ion concentrations of pH 4 to 14 although most efficient operation is obtained in a basic solution. Also the cation exchange resin of this invention may be economically regenerated by moderate amounts of acid. The exchange resins of this invention are also useful in chromatographic separations since they hold adsorbates tighter than such adsorbates are held by carboxylic acid cation exchange resins and yet release adsorbates more readily than sulfonic acid type cation exchange resins.

In greater detail, any of the well known aromatic resin matrices commonly used to provide an insoluble base for the functional groups in ion exchange resins may be employed in the preparation of the phosphorus acid cation exchange resins hereof. Such resin matrices are insoluble in all aqueous and non aqueous solutions and have good physical strength to assure resistance to abrasion and production of fines during the use and regeneration of the ion exchange resin. Also, the resin matrix should preferably be somewhat porous so that all of the functional ion exchange groups attached to the resin matrix will be readily available. Either the bulk or bead form of the resin matrix may be used.

One well known type of resin matrix that is most useful in the practice of this invention is the base resin disclosed in U. S. Patent No. 2,366,007 and others. This resin matrix or base is the cross-linked copolymer of a monovinyl and a polyvinyl aromatic compound, and it is prepared by copolymerizing one or more monovinyl aromatic compounds with one or more divinyl aromatic compounds in the presence of a polymerization catalyst.

Suitable monovinyl aromatic compounds that may be used in the preparation of this type of resin matrix are well known, examples being styrene, vinyl toluene, vinyl naphthalene, ethyl vinyl benzene, and alpha methyl styrene as well as other monovinyl compounds mentioned in the aforementioned patents and not specified herein.

Any polyvinyl compound may be used which will form a cross-linked, insoluble, infusible copolymer when copolymerized with the monovinyl aromatic compound of the class described. Polyvinyl compounds suitable for the reaction hereof are well known in the synthetic resin art. Examples of such compounds are divinyl benzene, divinyl toluenes, divinyl xylenes, divinyl naphthalenes, trivinylbenzene, diallyl phthalate, or diallyl fumarate, as well as the polyvinyl compounds otherwise specified in the aforementioned patents. The usual commercial mixtures containing divinyl benzene are preferred for use in providing the divinyl constituent because of their ready availability.

Polymerization catalysts that effect rapid polymerization of mixtures of such monovinyl and polyvinyl compounds are well known in the art. Among the suitable catalysts for use in the practice of this invention are ozone, organic peroxide agents, inorganic peroxides and the "per" salts such as water soluble perborates, persulfates and perchlorates.

The proportions of the monovinyl aromatic compound and the polyvinyl compound employed in the preparation of the resin matrix may vary considerably, and the resultant exchange resin produced therefrom may be used for ion exchange purposes regardless of such variations in proportions. However, the relative amounts of the monovinyl compound and polyvinyl compound employed govern properties such as hardness and complexity of the resin matrix, which properties in turn affect subsequent reactions of the resin matrix and also the properties of the final exchange resin.

Too small an amount of the polyvinyl compound results in a resin matrix that swells considerably and may partially dissolve in subsequent reaction media, and the final exchange resin may also swell excessively in the course of ion exchange reactions. Furthermore, use of too small an amount of the polyvinyl compound provides an exchange resin of comparatively low density and as a result the exchange resin has a low capacity per unit volume. On the other hand, too great a percentage of the polyvinyl compound provides a dense resin matrix that will react very slowly in the subsequent steps of preparing the ion exchange resin. Also, when a high proportion of the polyvinyl compound is employed, the resultant dense final exchange resin has a low rate of ion exchange and a low exchange capacity.

The preferred range of the monovinyl aromatic compound is from 60.0% to 99.9% on a molar basis, and the preferred range of the polyvinyl compound is from 40.0% to 0.1%. Thus, the resultant copolymerized base resin is formed from a major proportion of the monovinyl compound. Approximately 0.1% to 2.0% of the catalyst is used based upon the total weight of the compounds to be copolymerized.

The polymerization of the monovinyl aromatic compound and the polyvinyl compound may be carried out by any of a variety of well known methods as described in the aforementioned patents. A mixture of the compounds may be polymerized or the compounds may be suspended in a liquid medium and then polymerized. The well known technique of suspension polymerization described in Chapter I, pages 1 to 20 of "High Molecular Weight Organic Compounds," by Hohenstein and Mark is preferred. In this process a mixture of the liquid vinyl compounds and a soluble peroxide, such as benzoyl peroxide, are suspended in an aqueous medium containing a suspending agent such as hydroxyethyl cellulose or gum arabic. The application of heat to the suspension converts the compounds successively into viscous droplets, small rubbery particles, and finally into hard bead-like spheres. Nearly all the spheres of the insoluble vinyl hydrocarbon copolymer pass a 16 mesh screen but are retained on a 60 mesh screen. The resultant dried spheres provide an excellent resin matrix for use in the preparation of a phosphorus acid cation exchange resin.

Another specific example of a resin matrix that may advantageously be employed in the preparation of the cation exchange resins of this invention is the well known resin resulting from the condensation polymerization of phenol with aldehydes. United States Patent No. 2,389,865 contains a detailed description of one method of preparing a resin matrix of this type, which description need not be repeated here. This patent covers a porous phenol formaldehyde resin that is particularly designed to serve as a resin matrix for ion exchangers. Consequently, this aromatic resin matrix may also be employed in the preparation of the phosphorus acid cation exchange resins of this invention.

The next step in the preparation of the cation exchange resin of this invention after formation of the resin matrix is to react the resin with phosphorus trihalide in the presence of a catalyst to produce the halophosphine derivative of the resin. Tests made pursuant to this invention have established that a phosphorus pentahalide will not serve to produce a satisfactory phosphorus acid cation exchange resin. Suitable phosphorus trihalides may be used, such as the bromide, but phosphorus trichloride is preferred because it is relatively inexpensive, readily available and the most reactive. Anhydrous aluminum chloride (Friedel-Crafts catalyst) should be employed to produce a satisfactory exchanger. Other similar metallic halide compounds that are sometimes used as catalysts in place of aluminum chloride, produce inferior results.

The reaction of phosphorus trihalide with the aromatic nuclei of the resin matrix is best carried out by placing the thoroughly dried resin matrix itno a vessel containing an excess of the liquid phosphorus trihalide and then adding the anhydrous aluminum chloride. If desired, the reaction may be carried out in presence of an inert anhydrous organic solvent, such as perchloroethylene. However, these additional inert solvents are not necessary as the phosphorous trichloride itself provides a liquid medium in which to carry out the reaction. In the case of aromatic resins that do not contain hydroxyl groups such as the vinyl copolymers previously described, the reaction is fairly slow. With such resin matrices it is necessary for maximum reaction to heat the mixture of the resin matrix, phosphorous trihalide and aluminum chloride under reflux at the boiling point of the phosphorus trihalide. The mixture is preferably refluxed for at least six hours using a calcium chloride tube to maintain anhydrous conditions. The reaction is about seventy-five percent complete after two hours under proper anhydrous conditions, and it takes about six hours for the reaction to reach maximum completion. Further refluxing beyond six hours does not appear to increase or diminish the yield of the resultant halophosphine derivative of the resin matrix.

After the reaction between phosphorus trihalide and the resin matrix has been concluded, the excess phosphorus trihalide should be removed before proceeding with the hydrolysis step. This is desirable because of the chemically reactive nature of phosphorus trihalide and its decomposition in aqueous solutions to form phosphorus and the halogen acid. The excess phosphorus trihalide is preferably removed by vacuum distillation. The removal of the phosphorus trichloride by such distillation is more efficiently carried out if an inert liquid, such as perchloroethylene, that serves as a heat transfer medium is added. It is not necessary to remove the excess aluminum chloride since this does not interfere with subsequent reactions.

The exact proportional amount of phosphorus trihalide, anhydrous aluminum chloride, and resin matrix employed is not too critical provided that the reactants exceed preferred minimum amounts. The phosphorus trihalide need merely be in excess of the amount that will react with the resin matrix. However, best results are obtained by use of at least three moles of phosphorus trihalide per mole of styrene in the resin matrix. This can be easily provided for by maintaining an amount of liquid phosphorus trihalide continuously in contact with the resin matrix during the reaction that is sufficient to maintain the resin matrix in suspension and enable it to be easily stirred. The proportional amount of anhydrous aluminum chloride employed is preferably at least about one mole of aluminum chloride for each aromatic ring on the resin matrix. Lesser amounts of aluminum chloride may be used, but result in a reduction of the yield of the reaction. Amounts of aluminum chloride greater than one mole per aromatic nucleus do not appear to have any appreciable effect on the reaction yield.

The reaction of the phosphorus trihalide with the aromatic nuclei of the resin matrix results in attachment of trivalent phosphorus directly to carbon of the aromatic nuclei of the resin matrix. It is believed that somewhere in the order of one phosphorus atom becomes attached to each aromatic nucleus in the resin matrix. Undoubtedly the reaction results in the formation of the dihalophosphine derivative of the resin matrix. It is unlikely that the monohalophosphine derivative of the resin matrix, in which two aromatic nuclei are attached to one phosphorus atom, is formed since the resin matrix structure is quite rigid. The relatively large amount of aluminum chloride required for a complete reaction indicates that the aluminum chloride acts as a complexing agent rather than as a true catalyst. The aluminum chloride is later removed in the succeeding hydrolysis step.

When the aromatic resin matrix contains hydroxyl groups, such as the hydroxyl groups in the phenol formaldehyde resin matrix previously described, phosphorus trihalide will react with such hydroxyl groups regardless of whether or not aluminum chloride is present. The reaction of phosphorus trichloride with the hydroxyl groups is exothermic and the mixture should be cooled to keep the reaction under control. The phosphorus trihalide reaction with the hydroxyl groups results in attachment of trivalent phosphorus to the oxygen atoms on the resin. Upon subsequent hydrolysis, in which the halogen atoms attached to phosphorus are replaced by hydroxyl groups, the phosphorus acid thus attached to oxygen atoms of the resin has somewhat different characteristics than the phosphorus acid attached to the carbon atoms of the aromatic nuclei.

The foregoing reaction has been demonstrated by preparing two cation exchange resins in accordance with the method of this invention using identical phenol formaldehyde resin matrices. All reactants and conditions were the same except that no aluminum chloride was used in the preparation of one of the final cation exchange resins. The acid form of the cation exchange resin prepared with aluminum chloride exchanged hydrogen ion for sodium ion in a sodium chloride solution, and also provided an appreciably greater exchange capacity of sodium in a sodium bicarbonate solution. However, where no aluminum chloride was used in the preparation of the final cation exchange resin, sodium ion in a sodium chloride solution was exchanged but no further exchange occurred with sodium ion in a sodium bicarbonate solution. This experiment indicates that the more highly dissociated functional phosphorus acid groups attached to oxygen atoms of the resin matrix was present in both instances, but that the aromatic phosphorus acid groups less able to split neutral salts were not present in the exchange resin prepared without use of aluminum chloride.

Hydrolysis of the halophosphine derivative of the resin matrix is the next step in the preparation of the cation exchange resins of this invention. In this step the halogen atoms attached to phosphorus are replaced by hydroxyl groups and hydrochloric acid is given off. Water alone will produce some hydrolysis of the halophosphine derivative of the resins. However, best results are obtained by first washing the resin with water and then hydrolyzing the resin in an aqueous solution of a suitable alkali, such as calcium hydroxide but preferably an alkali metal hydroxide, at elevated temperatures. The concentration of the alkali, time of reaction and temperature are not critical. Sodium hydroxide solutions of from 1 Normal to 18 Normal have been used for periods of time ranging from ½ hour to 24 hours with acceptable results. Hydrolysis for 2 hours with 2 Normal sodium hydroxide at 90° C. to 100° C. is the preferred way of carrying out the hydrolysis step.

The initial addition of water to the reaction mixture of phosphorus trihalide, resin matrix, and aluminum chloride should be carried out under a well ventilated hood or out of doors because of heat generated and the halogen acid given off from the reaction of water with residual phosphorus trihalide. Also, hydrolysis of the halophosphine groups results in generation of a small amount of heat and release of some halogen acid.

The hydrolysis step also results in removal of the anhydrous aluminum chloride catalyst remaining from the previous step. This removal is partly due to the initial washing of the resin with water, and more completely due to formation of soluble sodium aluminate from the remaining aluminum chloride when the resin is placed in the alkali solution.

After the foregoing step of hydrolysis of the halophosphine derivative of the resin matrix, the resin may be washed in an excess of a dilute solution of acid. This results in production of a cation exchange resin with acid hydroxyl groups attached to trivalent phosphorus. This exchange resin is believed to be essentially a phosphonous acid derivative, and is intermediate in activity between the sulfonic acid and carboxylic acid type cation exchange resins. The exchange resin so produced may be used and regenerated with any suitable acid just as any of the well known cation exchange resins.

However, the cation exchange capacity of the foregoing trivalent phosphorus type exchange resin may be advantageously increased by oxidizing the trivalent phosphorus in the functional acid groups to pentavalent phosphorus, which is believed to form essentially a phosphonic acid derivative. As was previously mentioned, a suitable pentavalent phosphorus exchange resin is not produced using a phosphorus pentahalide in the first instance, since the pentahalide does not produce the particular type of reaction with the resin matrix as does the phosphorus trihalide. Oxidation of the trivalent phosphorus increases the capacity of the exchange resin by increasing the number of active acid groups attached to phosphorus that are available for exchange of cations. Furthermore, the oxidation to the pentavalent form provides an increase in exchange capacity greater than that which would be expected from the increased number of acid groups that are attached to the pentavalent phosphorus. This additional increase in capacity is probably due to the swelling of the resin during oxidation which opens up the resin and makes additional acid groups readily available for exchange of cations.

The oxidation of the trivalent phosphorus may be carried out by employing any well known strong oxidizing agent. Fairly concentrated solutions of nitric acid or hydrogen peroxide are examples of oxidizing agents that have been successfully employed to oxidize the trivalent phosphorus atom in the exchange resin to the pentavalent form. An excess of 2 Normal nitric acid at 95° C. will complete the oxidation of the phosphorus in the exchange resin in approximately 2 hours.

As an alternative procedure for producing the pentavalent form of exchange resin, the oxidation to pentavalent phosphorus may be carried out before the previously related hydrolysis of the halophosphine derivative of the resin matrix instead of following the hydrolysis. In this alternative procedure, the dihalophosphine derivative of the resin matrix is first freed of excess phosphorus trihalide in the manner previously related and then oxidized. One method of oxidation of the dihalophosphine derivative of the resin matrix is to bubble dry halogen gas, such as chlorine, into the dihalophosphine derivative of the resin suspended in an inert solvent, preferably a chlorinated hydrocarbon, such as tetrachloroethane. The resultant oxidized product, which is the tetrahalo derivative, is freed of excess solvent, washed with water, and then hydrolyzed in dilute alkali, as previously described herein, to form an exchange resin with acid groups based on pentavalent phosphorus.

Another method of oxidizing the phosphorus to the pentavalent form before hydrolysis of the dihalophosphine derivative of the resin matrix is to subject such derivative to chromic acid, as an oxidant, in a medium inert to the reactants, such as glacial acetic acid. These methods of preparation of the pentavalent phosphorus acid derivative of the resin by oxidation before the hydrolysis step produce a cation exchange resin having the same functional groups as the exchange resin formed by hydrolysis of the halophosphine derivative of the resin prior to the oxidation step. However, the most convenient way of obtaining an exchange resin with pentavalent phosphorus acid functional groups is the procedure previously described in which the hydrolysis is carried out prior to oxidation, and consequently such method is preferred.

The resultant cation exchange resin with acid groups based on pentavalent phosphorus is quite similar in properties to the exchange resin with acid groups based upon trivalent phosphorus. However, as previously mentioned, the pentavalent phosphorus acid form of the cation exchange resin has the higher exchange capacity. The exchange resins of this invention in which phosphorus is in the trivalent state (phosphonous acid derivative) have provided total cation exchange capacities of as high as 2.8 equivalents of sodium in a dilute sodium hydroxide solution per liter of resin. The pentavalent phosphorus acid (phosphonic acid derivative) form of the cation exchange resins of this invention has under similar conditions provided total exchange capacities of as high as 3.5 equivalents of sodium in dilute sodium hydroxide solutions per liter of resin. Both the trivalent and pentavalent phosphorus acid groups are sufficiently strong so that they split to some extent neutral salts such as NaCl, $Na_2SO_4$, and KCl with formation of the corresponding acids. Also, the acid form of the resins of this invention efficiently removes sodium from solutions of sodium bicarbonate or sodium hydroxide.

As is the case with other cation exchange resins, the phosphorus acid resins of this invention may be regenerated after they are exhausted. Regeneration is accomplished by the well known method of washing the resin with an excess of an aqueous solution of a dilute acid. This washing with acid results in replacement of the adsorbed cations by hydrogen ion, and thereby returns the functional groups on the resin to the acid state. Dilute solutions of sulfuric or hydrochloric acids are commonly used for this purpose since these acids are economical and readily available.

The following are typical examples of the preparation of phosphorus acid cation exchange resins in accordance with this invention.

EXAMPLE I

*Preparation of a resin matrix*

Spherical granules of a cross-linked polystyrene resin copolymer were prepared by utilizing 400 parts by weight of an aqueous solution containing 0.5% by weight of gum arabic as a suspending agent, and stirring into such solution a non-aqueous phase consisting of 29.5 parts by weight of a commercial mixture of divinyl benzene (which commercial mixture contained 54.2% divinyl benzene, 32.5% ethylvinyl benzene, and the remaining 13.3% high boiling saturated compounds), 170.5 parts by weight of styrene, and 1.5 parts by weight of benzoyl peroxide as a catalyst. The suspension was stirred gently so that the non-aqueous phase was dispersed in the aqueous phase in the form of liquid globules averaging about 0.5 mm. in diameter. The mixture was kept in a container enclosed by a heating mantle maintained at a temperature of 85° C. for three and one-half hours until gelation occurred. The temperature was then maintained at 95° C. for 16 hours during which time the gelled particles changed to hard, white bead-like granules. The bead-like granules were filtered off, cooled, washed thoroughly in water and dried overnight at 40–45° C.

*Reaction of the resin matrix with phosphorus trihalide*

50 parts by weight of the thoroughly dry bead-like resin matrix produced as described above was placed into a vessel containing 268 parts by weight of phosphorus trichloride, and then 60 parts by weight of anhydrous aluminum chloride was added. The mixture was heated under reflux, maintaining anhydrous conditions by use of a calcium chloride tube, in a flask fitted to a reflux condenser at the boiling point of the phosphorus trichloride for 6 hours. Perchloroethylene was then added to serve as a heat transfer medium and then substantially all of the phosphorus trichloride was removed by fractional distillation.

*Hydrolysis*

The dichlorophosphine derivative of the resin prepared as above described was placed into a large excess of water out of doors and stirred, with resultant evolution of hydrogen chloride gas accompanied by generation of heat. The resin beads were washed several times with water and then with a solution of 2 Normal sodium hydroxide. Finally, the dichlorophosphine derivative of the resin was placed in a glass vessel containing 2 Normal sodium hydroxide and was heated for 2 hours at 90° C. in order to complete the hydrolysis. The resin beads were then washed in an excess of 4 Normal hydrochloric acid, rinsed with pure water and the excess water drained off.

The capacity of the resultant phosphorus acid cation exchange resin having acid groups based on trivalent phosphorus was determined by conventional procedure with sodium chloride, sodium bicarbonate and sodium hydroxide solutions. The total exchange capacity of the hydrogen form of the resin for sodium was 0.6 equivalent per liter of resin in the sodium chloride solution and 2.6 equivalents per liter of resin in the sodium bicarbonate and sodium hydroxide solutions.

EXAMPLE II

A dichlorophosphine derivative of the polystyrene resin was prepared in accordance with the first two paragraphs of Example I.

*Oxidation*

The resultant dichlorophosphine derivative was placed in a vessel containing sufficient tetrachloroethane to suspend the beads. The tetrachloroethane was used merely to serve as an inert suspending agent. Gaseous chlorine was bubbled into the vessel containing the suspension, which had been placed under a well ventilated hood, until it could be visually determined that the chlorine was no longer being absorbed, at which point the reaction is complete. The reaction of chlorine with the dichlorophosphine derivative of the resin was exothermic and it was occasionally necessary to place the vessel in an ice water bath for cooling.

*Hydrolysis*

After the reaction of the chlorine with the dichlorophosphine derivative of the resin was completed and the tetrachlorophosphine derivative of the resin formed, the excess tetrachloroethane solvent was poured from the vessel. The resin was then carefully hydrated, washed, hydrolyzed and again washed in the same manner specified in Example I for the hydrolysis treatment.

The capacity of the resultant cation exchange resin having acid functional groups based on pentavalent phosphorus was determined by conventional procedure with aqueous solutions of sodium chloride, sodium bicarbonate and sodium hydroxide. The exchange of the hydrogen form of this resin for sodium was 0.9 equivalent per liter of resin in the sodium chloride solution, 2.8 equivalents per liter of resin in the sodium bicarbonate solution and 3.1 equivalents per liter of resin in the sodium hydroxide solution.

EXAMPLE III

The final exchange resin prepared in Example I having acid groups based upon trivalent phosphorus was employed as the starting point in this example.

*Oxidation*

The cation exchange resin of Example I was oxidized by immersing the resin in a flask containing an excess of 2 N nitric acid. The temperature of the mixture was maintained at 95° C. for two hours by means of a heating mantle, and the mixture was constantly stirred. The oxidation was carried out under a well ventilated hood due to foaming and production of nitric oxide as a by-product.

After the two hour oxidation period, the mixture was allowed to cool and the oxidized cation exchange resin beads were then washed with water.

The capacity of the resultant phosphorus acid cation exchange resin having acid groups based on pentavalent phosphorus was determined by conventional procedure with sodium chloride, sodium bicarbonate and sodium hydroxide solutions. The total exchange capacity of this hydrogen form of the resin for sodium was 1.0 equivalent per liter of resin in the sodium chloride solution, 3.0 equivalents per liter in the sodium bicarbonate solution, and 3.3 equivalents per liter in the sodium hydroxide solution.

I claim:

1. The method of preparing a water insoluble polymerizate of a polyvinylaryl compound containing a phosphorus atom linked to an aryl nucleus and to an ionizable group which comprises treating a water insoluble copolymer of styrene and divinylbenzene with phosphorous trichloride in the presence of aluminum chloride and hydrolyzing the chlorine atoms attached to the phosphorus atoms of the resultant product.

2. The method of preparing a watery insoluble polymerizate of a polyvinylaryl compound containing a phosphorus atom linked to an aryl nucleus and to an ionizable group which comprises treating a water insoluble copolymer of a mono vinyl aromatic hydrocarbon and a polyvinyl aromatic hydrocarbon with phosphorous trichloride in the presence of aluminum chloride and hydrolyzing the chlorine atoms attached to the phosphorous atoms of the resultant product.

3. The product resulting from the method of claim 1.

4. The product resulting from the method of claim 2.

References Cited in the file of this patent

Bregman: J. Am. Chem. Soc., 74, 1867–8, April 5, 1952.